Figure 1:
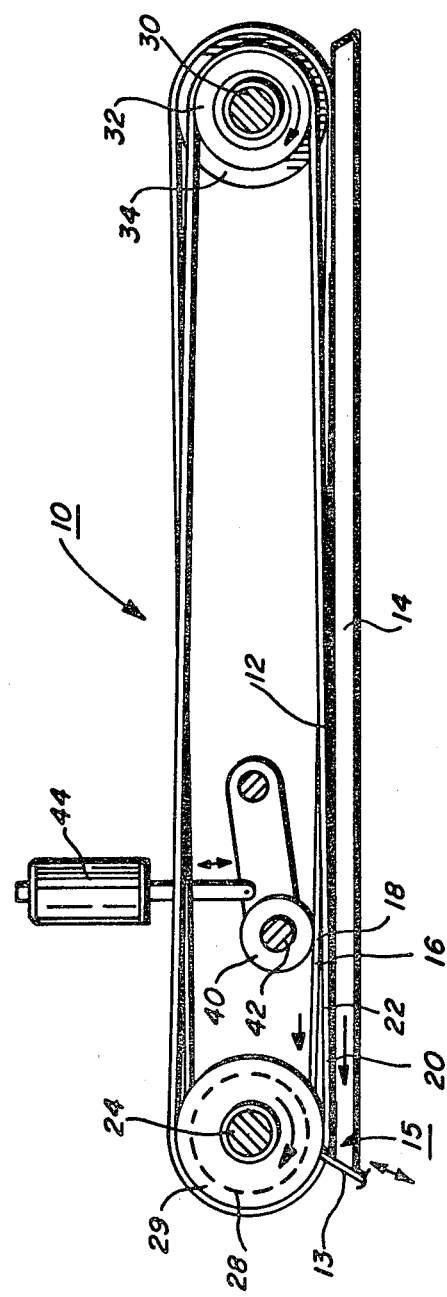

United States Patent [19]

Acquaviva

[11] Patent Number: 4,470,591

[45] Date of Patent: Sep. 11, 1984

[54] VARIABLE FORCE DOCUMENT HANDLING SYSTEM

[75] Inventor: Thomas Acquaviva, Penfield, N.Y.

[73] Assignee: Xerox Corporation, Stamford, Conn.

[21] Appl. No.: 407,399

[22] Filed: Aug. 12, 1982

[51] Int. Cl.³ .............................................. B65H 9/04
[52] U.S. Cl. ................................... 271/245; 198/817; 355/75
[58] Field of Search ................ 271/3.1, 245, 246, 233, 271/275; 355/75, 76; 198/725, 817

[56] References Cited

U.S. PATENT DOCUMENTS

| | | | |
|---|---|---|---|
| 3,844,552 | 10/1974 | Bleau et al. | 271/245 |
| 4,085,929 | 4/1978 | Tuchiya et al. | 271/122 |
| 4,135,808 | 1/1979 | Morrison | 271/245 |
| 4,146,220 | 3/1979 | Barton | 271/233 |
| 4,158,500 | 6/1979 | Di Francesco et al. | 271/3.1 |
| 4,190,185 | 2/1980 | Thate | 226/172 |
| 4,314,006 | 2/1982 | Lentz et al. | 428/494 |
| 4,322,160 | 3/1982 | Kobus | 355/75 |
| 4,353,541 | 10/1982 | Parzygnat | 271/275 |
| 4,428,667 | 1/1984 | Phelps et al. | 271/245 |

OTHER PUBLICATIONS

J. A. Craft and J. W. Spears, "Moving Backup Belts for Semiautomatic Document Feed", IBM Technical Disclosure Bulletin, vol. 15, No. 2, Jul. 1972, pp. 389–390.

Xerox Disclosure Journal, "Document Handling System", by James M. Stana, vol. 4, No. 6, Nov./Dec. 1979, p. 751.

*Primary Examiner*—Bruce H. Stoner, Jr.
*Assistant Examiner*—John A. Carroll

[57] ABSTRACT

An improved document handler for transporting and registering document sheets over the platen of a copier, having first and second plural sets of document transport belts extending in the direction of document transport over the platen, with the first set of belts being transversely interdigitated with the second set of belts, with the first set of belts having a substantially higher frictional driving force on document sheets than the second set of belts other than in said registration area to predominantly control the transporting of a document sheet over the platen except in the registration area, and with the second set of belts being more closely positioned to the registration area of the platen than the first set of belts and driven at a slightly higher speed so as to predominantly control the transport of a document sheet in the registration area during its registration.

15 Claims, 2 Drawing Figures

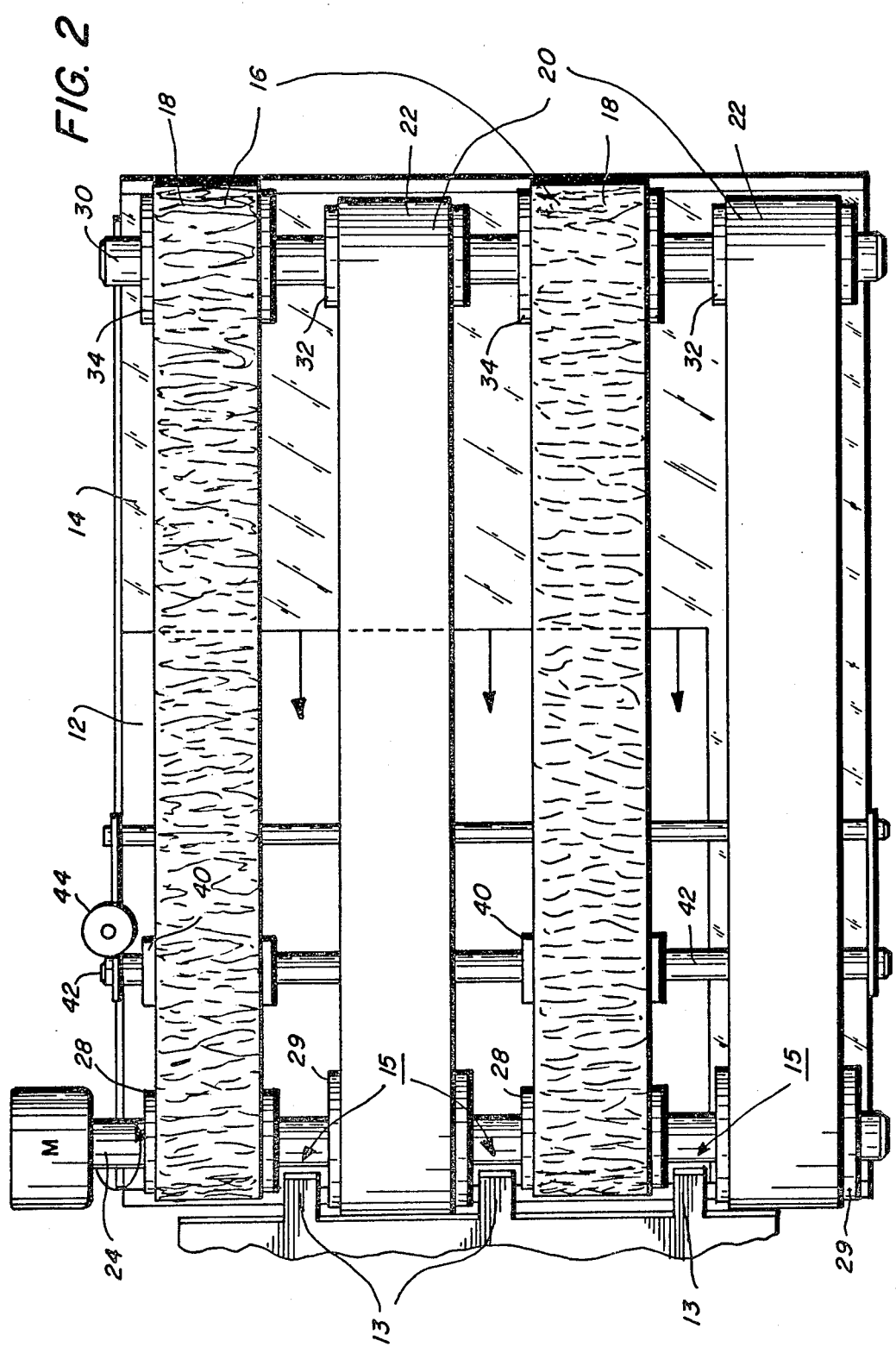

VARIABLE FORCE DOCUMENT HANDLING SYSTEM

The present invention relates to a document handling system and more particularly relates to an improved method and apparatus for automatically transporting, registering and deskewing individual document sheets to be copied on a copier platen utilizing different transport belts.

As xerographic and other copiers increase in speed, and become more automatic, it is increasingly important to provide higher speed yet more reliable and more automatic handling of the original document sheets being copied, i.e. the input to the copier. It is desirable to feed, register and copy document sheets of a variety or mixture of sizes, types, weights, materials, conditions and susceptibility to damage, yet with minimal document jamming, wear or damage by the document transporting and registration apparatus, even if the same documents are automatically fed and registered repeatedly, as for recirculating document precollation copying.

Even with slower copying rate copiers, it has become increasingly desirable to provide at least semi-automatic document handling, allowing an operator to "stream feed" originals into an input of the copier document handler, with the document handler doing the deskewing, final registration and feeding of the documents into and through the copying position, and then ejecting the documents automatically. However, for compact and low cost copiers, an appropriate document handler must also be simple, low cost and compact.

A preferably document handling system is one that utilizes an existing or generally conventional copier optical imaging system, including the external transparent copying window (known as the platen) of the copier. It is also desirable that the document handling system be readily removable, as by pivoting away, to alternatively allow the copier operator to conventionally, manually place documents, including books, on the same copying platen. Thus, a lighter weight document handler is desirable. It is also desirable for the same registration edge or position to be available for such manual copying as is used for the document handler.

In the description herein the term "document" or "sheet" refers to a conventional flimsy sheet of paper, plastic, or other conventional or typical individual image substrate (original or previous copy), and the like, and not to microfilm or electronic image originals which are generally much easier to manipulate. However, the terms "copier" or "copying" here are intended to encompass electronic document reading devices which record or transmit the information read from the document in electronic or other form not limited to copy sheets.

Although faster and more accurate automatic registration of the individual original document sheets at the correct position on the platen to be copied is desired, it is difficult to accomplish without skewing (slightly rotating) the document and/or damaging the edge of the document being stopped. Document sheets can vary widely in sheet size, weight, thickness, material, condition, humidity, age, etc.. Documents may have curls, wrinkles, tears, "dog-ears", cut-outs, overlays, paste-ups, tape, staples, adhesive areas, or other irregularities. Unlike copy sheets, which generally are all from the same batch and cut from the same paper reams, and therefore of almost exactly the same condition and size, original document sheets often vary considerably even if they are all of the same "standard" size, (.e.g. letter size, legal size, A-4, B-4, etc.) because they have come from different paper batches or have variably changed size with different age or humidity conditions, etc.. Yet it is desirable to automatically or semi-automatically rapidly feed, register and copy a set of individual documents with a mixture of sizes, types, and conditions without document jams or document damage and with each document correctly and accurately aligned to the registration position.

One of the most difficult to achieve requirements for automatic document handling is the accurate and reliable, but safe, registration of the original document at the proper position for copying. Conventionally the document is desirably automatically either center registered or corner registered (depending on the copier) by the document handler at a pre-set registration position relative to the copier platen, with two orthogonal edges of the document precisely aligned with two registration lines of the copier platen i.e. with the original document aligned with the copier optics and copy sheet registration system. This registration accuracy is desirably consistenly within less than 1 millimeter. If the document is not properly registered, then undesirable dark borders and/or edge shadow images may appear on the ensuing copy, or information near an edge of the document may be lost, i.e. not copied onto the copy sheet. Skewing can also affect proper restacking of the documents.

As shown in the cited art, document handling systems have been provided with various document transports to move the original document sheets over the copier platen and into and out of registration. Various combinations of such transports are known with various registration devices or systems. It is known in the art to register the original document for copying at the appropriate position relative to the transparent copying window in various ways. Typically the document sheet is registered by driving it against a gate or stop at or adjacent one edge of the platen. This may comprise projecting aligned fingers, or roller nips, or a single vertical surface, against which an edge of the sheet is driven into abutment to register the sheet. An important function of such registration is to also deskew the moving original document, i.e., to properly rotate and align it with the registration line as well as to determine and control its registration position.

As indicated, it is conventional to provide either fixed or retractable registration finger or gate document stopping edges aligned along the one edge of the platen, so as to physically register the document in its copying position. This also reduces transport criticality, i.e. allows slip or skewing of the document feeder to be accommodated and corrected. The document transport can be designed to slip briefly relative to the document lead edge striking the registration edge stop until positive deskewing and full registration are achieved. However, the same platen transport sheet feeder is preferably used to drive a document onto and off of the platen before and after copying as well as registering the lead edge of the document at the downstream platen edge. Registering the trail edge of the document by reversing the feeder and backing the document into a fixed registration edge at the upstream edge of the platen may be alternatively provided. In some document handling systems a system for also side registering or laterally positioning the document on the platen is used, i.e. positioning of the original on two axes on the platen. However this is not required, and lateral registration may be done upstream of the platen.

A severe limitation on such frictional over-platen document sheet transport and registering systems is that they must have sufficient drive force to reliably feed the document sheet, but must slip relative to the platen glass when no document sheet is therebetween without scratching or wearing the glass such that imaging through the glass is affected. As indicated above, the document transport normally needs to also slip relative to the document when the document is stopped by the registration edge stop. Further, the over-platen transport should minimize "show around" problems - i.e. undesirable dark areas or images on the copy sheet, especially for undersized documents, by visible portions of the transport extending beyond the document edges during copying. This has led to the use of single large white elastomeric belts for many document handlers in lieu of rollers or multiple belts, but such single belt systems have some inherent compromises in feeding and registration reliability. This is discussed, for example in U.S. Pat. No. 4,353,541 issued Oct. 12, 1982 by W. J. Parzgnat and the art therein, which includes solenoid actuated "kicker" or normal force belt loading rollers. Such an intermittently actuated platen transport belt backing or kicker roller is also disclosed for a narrow belt in U.S. Pat. No. 4,146,220 issued Mar. 27, 1979 to Peter Barton, to likewise alter the frictional driving force between the belt and the document.

Examples of the peculiar or special requirements for platen transport belt material (compared to other belts) are disclosed in U.S. Pat. No. 4,314,006 issued Feb. 2, 1982 to James A. Lentz and Joseph H. Moriconi.

A particular such limitation or compromise is that a document transport system which minimizes the introduction of document sheet skewing in feeding from the document set stack up to the registration position on the platen is highly desirable, in order to reduce the amount of skew needing correction (deskewing) in the registration position. Yet it is also desirable, but normally incompatible, to maximize document skewing during the document registration, i.e. to allow the document to be freely deskewed as it is driven into alignment with the registration edge. The present invention compatibly provides both of these features.

The present invention may be utilized as part of a recirculating document handler as well as for an automatic or semi-automatic document handler. Some examples of further details of exemplary recirculating document handlers with on-platen registration document transport and deskewing for which the present invention may be substituted are disclosed in U.S. Pat. Nos. 4,335,954 issuing June 22, 1982 to Russell L. Phelps; 4,278,344 issued July 14, 1981 to R. B. Sahay; 4,270,746 issued June 2, 1981 to T. J. Hamlin and 4,076,408 issued Feb. 28, 1978 to M.G. Reid, et al..

Various plural or multiple belt document sheet transport systems for copier platens are known, including the following examples: U.S. Pat. Nos. 3,844,552 issued Oct. 29, 1974 to C.D. Bleau et al; 4,322,160 issued Mar. 30, 1982 to G.S. Kobus; and the art cited or discussed therein; and IBM Technical Disclosure Bulletin Vol. 15, No. 2, July 1972, pp. 389-390. The latter shows two sets of belts - feed belts 12 and backup belts 16. These references also disclose a registration advantage of plural belt systems in that retractable or fixed platen registration edge fingers can extend between the plural belts, and vice-versa, for preventing the document from slipping past the fingers during registration.

In technologies or arts other than original document sheet platen transport and registration systems there are, of course, many other multiple belt systems, per se. Examples include copy sheet feeding, wherein U.S. patent application Ser. No. 385,626 filed June 7, 1982 by John Maksymiak (D/80278) discloses plural frictional copy sheet feeding belts wherein each belt has alternating and oppositely matched sections therealong of different coefficients of friction. Other flexible sheet conveyors in other applications are known with cooperative belts of different coefficients of friction, e.g. U.S. Pat. No. 4,190,185 issued Feb. 26, 1980 to Kurt Thate and 4,085,929 issued Apr. 25, 1978 to K. Tuchiya et al.

Examples of various other patents teaching document handlers and also control systems therefor, including document path switches, are U.S. Pat. Nos.: 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344 and 4,284,270. Conventional simple software instructions in a copier's conventional microprocessor controller logic circuitry and software of document handler and copier control functions and logic, as taught by these above and other patents and various commercial copiers, are well known and preferred. However, it will be appreciated that the document handling functions and controls described herein may be alternatively conventionally incorporated into a copier utilizing any other suitable or known simple software or hard wired logic systems, switch controllers, etc.. Such software for functions described herein may vary depending on the particular microprocessor or microcomputer system utilized, of course, but will be already available to or readily programmable by those skilled in the art without experimentation from the descriptions provided herein.

All references cited herein, and their references, are incorporated by reference herein for appropriate teachings of additional or alternative details, features, and/or technical background.

The present invention desirably overcomes or reduces various of the above-discussed problems. A desirable feature of the document handling system disclosed herein is to provide a document transport for a copier platen which automatically provides a lighter driving force during registration of the original document sheet on the platen than the driving force on the document when the document is entering onto the platen, so as to provide reliable feeding yet reduce the chances of buckling or damaging the document during that portion of its transport in which it is being registered, thereby overcoming a tendency of many present document transport belt systems to provide either too much or too little document driving force for one or both of these different transport portiions and conditions.

A preferred feature disclosed herein is to provide, in a document handler for transporting, with a plural driven belt sheet transport, and registering document sheets over the platen of a copier, said registration being to an area adjacent one side of said platen, the improvement comprising: first and second plural sets of document transport belts extending in the direction of document transport with said belts of said first set of belts being transversely inter-digitated with said belts of said second set of belts over said platen, said belts of said first set of belts having a substantially higher frictional driving force on document sheets than said belts of said second set of belts, and said belts of said second set of belts being differently positioned relative to said registration area of said platen from said belts of said first set of belts so that said lower frictional driving force belts of said second set of belts predominantly control the transport of a document sheet in said registration during registration of that document sheet.

Further features which may be provided by the method and apparatus disclosed herein, individually or in combination, include those wherein said second set of belts is mounted to normally engage a document sheet on the platen at or adjacent said registration area of said platen; said first set of belts is mounted normally spaced from said platen in said registration area for driving said belts of said second set of belts faster than said belts of said first set of belts during at least the registration of a document sheet in said registration area of said platen; said first set of belts is normally spaced from but extending over said registration area of said platen, and wherein sheet ejection means are provided for intermittently forcing a portion of the belts of said first set of belts towards said platen at or adjacent said registration area for assisting in the ejection of a document sheet from the platen after the document sheet has been registered; said belts of said second set of belts are driven faster than said belts of said first set of belts and have a higher coefficient of friction than said second set of belts relative to a document sheet; said first set of belts is mounted to normally engage said platen at or adjacent a side thereof opposite from said registration area of said platen so that first set of belts predominantly controls the transport of a document sheet during the initial transport of a document sheet onto said platen; and wherein the platen overlying flights of said first and second sets of belts are oppositely slightly angled relative to said platen and relative to one another.

Another disclosed feature is a method of transporting document sheets onto and over a copier platen and into registration frictionally with plural frictional transport belts extending over the platen, and registering the document sheet in a copying position on the platen by frictionally driving the document sheet against a registration edge stop at or adjacent at least one edge of the platen with said frictional transport belts, comprising the steps of initially feeding a document sheet onto the platen primarily with a first plural set of higher frictional force transport belts which resist document sheet skewing and slipping, and then gradually transferring normal transport control of said document sheet to a second set of lower frictional force transport belts which allow greater document sheet skewing and slippage as the document sheet is transported over the platen by both said sets of belts towards said registration edge stop.

A further disclosed feature is wherein said gradual transfer of transport control is in proportion to the distance moved by the document sheet over the platen and is accomplished with movement of said transport belts in different paths which are slightly differently angled from one another over the platen.

Various of the above-mentioned and further features and advantages will be apparent from the examples described hereinbelow of specific apparatus and steps of operation. The invention will be better understood by reference to the following description of one specific embodiment thereof including the following drawing figures (approximately to scale) wherein:

FIG. 1 is a side view of an embodiment of an exemplary document handling apparatus utilizing the document transport and registration system of the present invention; and FIG. 2 is a plan (top) view of the apparatus of FIG. 1.

The exemplary document sheet handling system disclosed in FIG. 1 may be conventional except as otherwise described herein, and may be mounted to any suitable or conventional copier. Disclosed here as one example, but not limited thereto, is a semi-automatic document handler (SADH) unit 10. It is conventionally mounted over a conventional copier platen, preferably pivotably removable for alternative manual document placement on the platen. Alternatively, however this document handler 10 may be the platen transport portion of a recirculating document handler providing precollation copying. A document sheet 12 may be conventionally fed to the upstream end or entrance to the document handler 10, either manually or automatically fed from a stack of document sheets, as is known in the art. The document handler 10 receives the document sheet 12 and is designed to transport it reliably into the platen registration position for registered imaging thereof by the copier. Registration here is illustrated by a conventional retractable registration edge stop 13 at the downstream edge of the copier platen 14. As previously discussed, the requirements for the transporting of the document into the platen registration area 15 are different from the desired feeding forces on the document both prior and subsequent thereto. In the platen registration area 14 the document transport must slip relative to the document sheet 12 to prevent buckling or overdriving of the lead edge of the document sheet against the fingers or gates of the registration edge stop 13. Also it is desirable to allow the document sheet to skew slightly during this final movement thereof into registration so as to allow the transport to align the document to the line of the registration edge.

This registration skewing and slipping allowance is however, quite inconsistent with the desired non-skewing upstream feeding of the document before it reaches the registration area 15. It is also inconsistent with the desired rapid and non-skewing downstream ejection of the document from the platen after copying of the document is completed. That is, after the document has been registered and illuminated for exposure, it is desirable that the registration edge stop 13 be lowered out of the document path by a solenoid or other suitable mechanims and that the same document transport then be usable, by itself or with limited assistance, to rapidly eject the document from the downstream edge of the platen into a suitable catch tray or the like, and also to simultaneously rapidly feed on the next document to be copied. This ejection requires rapid acceleration of the document sheet which increases potential slippage or skew problems, both for the document being ejected and for the next document being fed in at high speed at the upstream or input area of the platen and its transport.

Here the platen transport is provided by two sets of document feed belts extending over the platen which are differently mounted and preferably also have different coefficients of friction, yet which are cooperatively inter-digitated and angled relative to one another and the platen to provide a desirable variable feeding force system for the documents, varying with the position of the documents on the platen and overcoming various of the abovedescribed problems. This exemplary transport and registration system here includes a first set of belts 16 comprising a plurality of high friction belts 18. These are inter-digitated with a second set of belts 20 comprising low friction belts 22. These are all belts which are narrow relative to the platen width and spaced apart sufficiently to allow the inter-digitation of the fingers of the registration edge stop 13 at the downstream end thereof for reliable document registration. With the illustrated arrangement the high friction belts 18 alternate side by side with the low friction belts 20 transversely across the platen. However both the high friction and low friction belts (both sets of belts) extend in the same document movement direction and both are adopted to engage and feed the document sheet, but not in the same manner, as will be described.

The belts 18 and 22 may be constructed from commercially available document belt materials for frictional platen transport document handlers. Examples of document belt materials are disclosed in the abovecited U.S. Pat. No. 4,314,006 issued Feb. 2, 1982 to James A. Lentz and Joseph H. Moriconi and in references cited therein. The differences in the coefficient of friction may be provided by changes in the formulation of the document belt material. For example, the coefficient of friction may be increased by increasing the proportion of polymer by decreasing the amount of fillers (non-rubber ingredients), or by using a more elastomeric polymer, such as a silicone rubber. Alternatively or additionally, the two different coefficient of friction belts may have different surface characteristics formed, for example, by molding, calendering, sanding, coating or otherwise treating the belt surface during manufacture. The higher friction belts 18 are thus shown with stippling on the surfaces thereof for illustration purposes in FIG. 2. However, as indicated, a difference in surface characteristics is not required, and both surfaces should be optically uniformly reflective for the copier optics so as to minimize "show-around" or printout of the belts at the edges of documents or "show-through" from behind the documents.

The differences in the coefficient of friction of the belts 18 and 22, relative to the document sheet to be transported, or their absolute values, need not be critical with the present system. In fact the coefficients of friction may be considerably less critical to maintain than for a conventional document belt system, due to the great differences here in the applied normal force of the respective belts against the document sheet in the registration area versus the feed-in area of the platen. That is, in the present system, the document frictional driving force, which is a function of both the coefficient of friction and the normal force, is substantially and oppositely varied by varying the respective relative positions between the two sets of belts and the platen as both sets of belts extend across the platen. The first set of belts 16 is positioned to maximize the normal force of its belts 18 at the input area of the platen and the second set of belts 20 is positioned to maximize the normal force of its belts 22 in the registration area 15 of the platen.

The two sets of belts are oppositely slightly angled relative to the plane of the platen. The first set of belts 16 extends generally linearly from contact with the platen (at or adjacent its upstream edge) upwardly at a slight angle so that the same lower flight of those belts 18 is normally spaced several millimeters above the platen at the registration end of the platen 14. In contrast, the second set of belts 20 are positioned such that the lower flight of the low friction belts 22 are spaced several millimeters above the platen in the input area for the document and then extend generally linearly at a slight angle to the platen down into contact with the platen in the registration area 15, including extending directly over the registration edge stop 13, so as to provide a document retaining and normal force nip with a document fed therebetween in this registration area (but not in the upstream area of the platen where the nip and normal force engagement is between the other belts 18 and the platen).

The different spacing and path of the belts is provided in this example by differently mounting the belts on different diameter rollers mounted on shafts adjacent opposite ends of the platen. These rollers support and tension opposite ends of all of the endless loop belts 18 and 22. As particularly shown in FIG. 2, a downstream mounting and drive shaft 24 is driven by a motor M to commonly drive on a single axis a plurality of small drive rollers 28 and large drive rollers 29. The smaller diameter drive rollers 28 both support and drive the downstream ends of the high friction belts 18. The larger diameter drive rollers 29 support and drive the lower friction belts 22. The slightly larger diameters of the rollers 29 drive the lower friction belts 22 at a slightly higher sheet transport velocity, proportional to the difference in roller diameter. As shown particularly in FIG. 1, this difference in diameter between the downstream rollers 28 and 29 also controls the difference in spacing of the respective belts 18 and 22 from the platen 14 in the downstream or registration area 15 of the platen and the approach thereto.

In contrast, a reversed difference in belt spacing from the platen is provided at the opposite upstream or document input end of the platen. There an upstream mounting shaft 30 supports small idler rollers 32 and large idler rollers 34. It may be seen that at this end the high friction belts 18 are mounted on the larger idler rollers 34 and the lower friction belts 22 are mounted on the smaller idler rollers 32, i.e. opposite from the drive rollers 28 and 29. These idler rollers 32 and 34 are freely indpendently rotatable on the upstream shaft 30 to accommodate the difference in velocity of the belts and the difference in rotational velocity of these pulleys. The idler rollers 32 and 34 provided a corresponding but opposite spacing of the belts 18 and 22 relative to the platen 14 at its upstream end as contrasted to the downstream or registration end of the platen. The larger diameters of the idler rollers 34 cause the high friction belts 18 thereon to normally engage or form a relatively high normal force document feeding nip with the platen 14 in this area of the platen.

Both shafts 24 and 30 are preferably conventionally floatingly or loosely mounted in the platen cover unit, so as to allow the belts to conform to the platen in their said contact areas with a controlled gravity and/or spring loading normal force when the platen cover is closed without any spacing or alignment criticality. It may also be seen that two high friction belts 18 are laterally positioned to engage opposite sides of the conventionally sized document 12, i.e. are widely transversely spaced relative the document for maximum document skew resistance and control.

It may be seen from the above that the lower friction belts 22 of the second set of belts 20 engage and normally predominantly control the transport of a document sheet in the registration area of the platen during the registration of the document sheet whereas the higher coefficient of friction belts of the first set of belts 16 engage and predominantly control the transport of the document sheet upstream thereof, and especially in the document input area. However there is a smooth, continuous and overlapping transition in the control of the document by the two sets of belts as they cooperatively feed the document across the platen. The relative spacing and control of document feeding changes gradually from one set of belts to the other as the document moves from one side of the platen to the other. Also, at least some part of the document is under the direct control of at least one of the sets of belts at all times, i.e. it is not free of, or released from the document transport at any time here. This transition in transport control is not only a function of the gradual transition in normal force with the transition in the relative spacings of the two sets of belts from the platen with changes in position of the document on the platen, but also is a function of the higher velocity of the belts 22 relative to the belts 18. That is, as the belts 22 gain control of the document near registration they, in effect, pull it away from the other belts 18. The effect of the higher friction but slower and (in this area) lower normal force belts 18 then becomes only a decreasing drag force rather than an advancing force. Thus the document advancing force, which determines the force with which the document lead edge is fed into abutment and alignment with the edge stop 13, is controlled by the belts 22 and not by the belts 18 during the critical final, registration alignment, movement of the document sheet over the platen. The slight drag force of the slower belts 18 during registration desirably reduces the impact or registration force of the document against the registration stop 13. Before this control transition occurs there will be, of course, some belt slippage of the faster belts 22 over the back of the document sheet, but the betls 22 are adapted to do so without damaging the document. Furthermore, the difference in velocity between the two sets of belts need not be a substantial or significant percentage of the normal document velocity. In fact, if desired, this difference in velocity need not be provided, i.e., as an alternative system, all of the belts may be driven at the same velocity and will still provide significant advantages provided by the differences in the document driving force provided by the differences in belt orientations relative to platen. However, the combination and cooperative affect of all these features is very desirable, and it may be seen that it is achieved here in a single integral and simple apparatus. That is, the combination of the different diameter drive rollers 28 and 29 and the different diameter idler rollers 32 and 34 provides both the positional differences in normal force and the differences in velocity for the two different sets of belts.

Considering now a further disclosed feature, there is additionally provided a method and apparatus for briefly intermittently changing the above-described document transport control by changing the normal position and normal force of the high friction belts 18 relative to the document sheet to assist in ejecting the document from the platen after it has been registered and copied. This is a system for intermittently pressing normal force or kicker rollers 40 into the back of the high friction belts 18 to temporarily deform these belts 18 downwardly into engagement with the document sheet at the time when ejection of the document from the platen is desired. Kicker rollers are known per se as discussed in the above-cited patent to William J. Parzygnat and the solenoid actuated references described and cited therein. The rollers 40 may be moved downwardly by a solenoid 44 repositioning its repositionable axis shaft 42 downwardly when the solenoid 44 is actuated. Only as long as the solenoid 44 is actuated a contact and high normal force and driving control is established between the high friction belts 18 and the document in the platen registration area 15 under the rollers 40 (which otherwise is normally not the case, as described above). Thus the high friction belts 18 may be utilized to rapidly accelerate and eject the document from the platen, without allowing slip or skewing of the document. The slightly faster low friction belts 22 already engaging the document there will slip slightly relative to the document but in a forward or feeding assistance force direction.

It will be appreciated that while four belts are illustrated in this example, and are preferred, that a substantially greater number of belts may be provided, particularly for larger sizes of documents. It will also be appreciated that while belts all of the same width are illustrated here, that belts of different widths may be provided. In fact, this is another way in which the frictional or driving force difference between the two sets of belts may be provided. That is, if the belts 22 are substantially narrower than the belts 18, and/or more flexible or thinner or the like, it may be possible to make both sets of belts of the same material and still provide an appropriate difference in frictional force on the document. That is, to provide such difference only by differences in width, weight, tension, or the like in the respective sets of belts. However, for maximum effect and control, the above-described difference in the coefficient in friction between the sets of belts is preferred, and may if desired, be supplemented by these other physical or material differences.

It will be noted that an edge-registered copier and document transport has been illustrated. For a center-registered document system the belt arrangement may differ. For example, one or two low friction belts may be positioned adjacent one another centrally of the platen so as to centrally engage the document during registration as does the single (second belt from the registration side) belt 22 in FIG. 2. Likewise the higher frictional force belts may be repositioned to optimize their engagement of the document for skew prevention.

It may be seen that there is disclosed an improved method of transporting document sheets onto and over the copier platen and into registration frictionally with plural fricitonal transport belts which extend over the platen and register the document sheet by frictionally driving the document sheet against a registration edge stop at or adjacent at least one edge of the platen with said same frictional transport belts, wherein the document sheet is initially fed onto the platen with a first set of transport belts which resist document sheet skewing and slippage, and then normal transport control over the document sheet is gradually transferred, as the document is transported across the platen, to a second set of lower driving force transport belts, which second set of belts allows greater document sheet skewing and slippage as the document sheet approaches the registration edge stop. This gradual transfer of control of the document is in proportion to the distance moved by the document sheet across the platen. It is preferably accomplished utilizing movement of the transport belts in slightly different but inter-digitated paths which are slightly differently angled from one another over the platen, and also wherein the second set of belts are driven slightly faster than the first set of belts and preferably have a lower coefficient of friction.

The embodiment disclosed herein, and others, are intended to provide a more positive and reliable yet gentle and automatic control of the driving and registration forces on the document sheet during the entire process of feeding, registering, deskewing, and ejecting the document. It will also be appreciated that the embodiment described herein is merely exemplary and that other variations, modifications, refinements, or alternative embodiments may be made by those skilled in the art from this teaching. They are intended to be encompassed by the following claims.

What is claimed is:

1. In a document handler for transporting, with a plural driven belt sheet transport, and registering document sheets over the platen of a copier, said registration being to an area adjacent one side of said platen, the improvement comprising:

first and second plural sets of document transport belts extending in the direction of document transport over said platen, the belts of each said set extending substantially from the document entrance of said platen to said registration area, said belts of said first set of belts having a substantially higher frictional driving force on document sheets than said belts of said second set of belts other than in said registration area to predominantly control the transporting of a document sheet over the platen except in said registration area, and said belts of said second set of belts being more closely positioned to said registration area of said platen than said belts of said first set of belts so that said belts of said second set of belts predominantly control the transport of a document sheet in said registration area during registration of that document sheet.

2. The document handler of claim 1 wherein said second set of belts is mounted to normally engage a document sheet on the platen at or adjacent said registration area of said platen, and said first set of belts is mounted normally spaced from said platen in said registration area.

3. The document handler of claims 1 or 2 wherein said belts of said first set of belts are transversely interdigitated with said belts of said second set of belts.

4. The document handler of claims 1 or 2 including means for driving said belts of said second set of belts faster than said belts of said first set of belts during at least the registration of a document sheet in said registration area of said platen.

5. The document handler of claim 4 wherein said first set of belts is mounted to normally engage said platen at or adjacent a side thereof opposite from said registration area of said platen so that said first set of belts predominantly controls the transport of a document sheet during the initial transport of a document sheet onto said platen.

6. The document handler of claims 1 or 2 wherein said first set of belts is normally spaced from but extending over said registration area of said platen, and wherein sheet ejection means are provided for intermittently forcing a portion of the belts of said first set of belts towards said platen at or adjacent said registration area for assisting in the ejection of a document sheet from the platen after the document sheet has been registered.

7. The document handler of claim 6 wherein said belts of said second set of belts are driven faster than said belts of said first set of belts, and said belts of said first set of belts have a higher coefficient of friction than said belts of said second set of belts relative to a document sheet.

8. The document handler of claims 1 or 2 wherein said first set of belts is mounted to normally engage said platen at or adjacent a side thereof opposite from said registration area of said platen so that first set of belts predominantly controls the transport of a document sheet during the initial transport of a document sheet onto said platen.

9. The document handler of claims 1 or 2 wherein the platen overlying flights of said first and second sets of belts are oppositely slightly angled relative to said platen and relative to one another and are interdigitated.

10. The document handler of claim 9 including means for driving said belts of said second set of belts faster than said belts of said first set of belts, and wherein said first set of belts is mounted to normally engage the platen at or adjacent a side thereof opposite from said registration area of said platen so that said first set of belts predominantly controls the transport of a document sheet during the initial transport of a document sheet onto said platen.

11. A method of transporting document sheets onto and over a copier platen and into registration frictionally with plural frictional transport belts extending over the platen, and registering the document sheet in a copying position on the platen by frictionally driving the document sheet against a registration edge stop at or adjacent at least one edge of the platen with said frictional transport belts, comprising the steps of initially feeding a document sheet onto the platen primarily with a first plural set of higher frictional force transport belts which resist document sheet skewing and slipping, and then gradually transferring normal transport control of said document sheet to a second set of lower frictional force transport belts which allow greater document sheet skewing and slippage as the document sheet is transported over the platen by said belts towards said registration edge stop, wherein the belts of each said set extend substantially from the document entrance of said platen to said registration area.

12. The method of claim 11 wherein said gradual transfer of transport control is in proportion to the distance moved by the document sheet over the platen and is accomplished with movement of said transport belts in different paths which are slightly differently angled from one another over the platen but are interdigitated.

13. The method of claim 11 wherein said belts of said second set of belts are driven faster than said belts of said first set of belts.

14. The method of claim 12 wherein said belts of said second set of belts are driven faster than said belts of said first set of belts.

15. The method of claims 11, 12 or 13 wherein the belts of said first set of belts are normally spaced away from said platen in the area of said registration edge, and wherein a portion of said belts of said first set of belts is intermittently pressed down against a document sheet on said platen to assist in ejecting it from the platen after it has been registered and copied.

* * * * *